April 28, 1964 W. E. BRANDT 3,131,383

SINGLE BIT RECORDING TECHNIQUE

Filed Feb. 8, 1960 3 Sheets-Sheet 1

INVENTOR
WILLIAM E. BRANDT
BY
ATTORNEY

April 28, 1964 W. E. BRANDT 3,131,383

SINGLE BIT RECORDING TECHNIQUE

Filed Feb. 8, 1960 3 Sheets-Sheet 3

United States Patent Office 3,131,383 Patented Apr. 28, 1964

3,131,383

SINGLE BIT RECORDING TECHNIQUE

William E. Brandt, Wappingers Falls, N.Y., assignor to International Business Machines Corporation, New York, N.Y., a corporation of New York Filed Feb. 8, 1960, Ser. No. 7,324
8 Claims. (Cl. 340—174.1)

Figure 1:
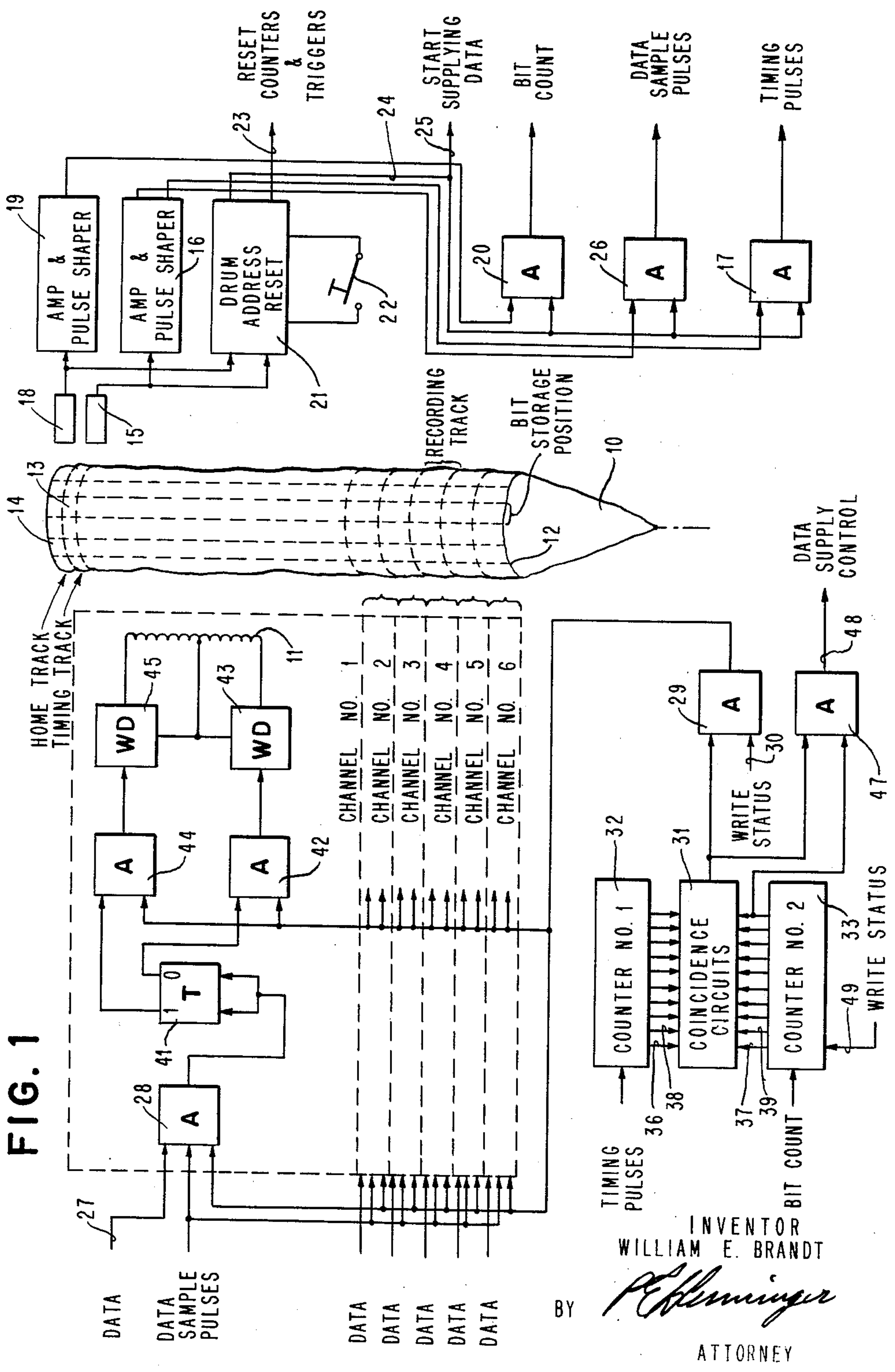

The present invention relates to data storage systems and, particularly, to systems for storing data in a recording medium in a succession of storage locations. While the storage system of the invention has wide utility, it has particular utility in magnetic drum data storage systems and will be described in that connection.

Data information is often conveniently represented in binary coded form utilizing plural binary code bits grouped into various preselected combinations and permutations each identifying an individual item of information such as alpha-numeric characters, symbols, and control functions. The code bits of each such group are often necessarily presented and translated successively as are the items of data information represented by successive code bit groups. Where a succession of code bits representing a succession of items of data information are to be stored in various forms of recording media, numerous recording techniques have been proposed and these are often quite satisfactory and more or less independent of the rate of information presentation so long as the rate of presentation does not exceed some upper limiting value. Magnetic recording media and techniques have the important virtue that their ability satisfactorily to record and store successive items of data information, and to read successively recorded items, enables an exceptionally high rate of information presentation and translation.

Magnetic recording devices are usually a component of a larger data processing system and accordingly are usually designed and operated to handle a maximum rate of data translation equal to or exceeding the maximum rate of data processing by the system. Often, however, the rate of data code bit presentation for recording is substantially lower than the maximum permissible rate of data translation by the recorder device. In these instances, particular and usually more or less complicated data storage arrangements have been proposed by which the slowly presented code bits of the code bit groups representing items of data may be collected in temporary storage over an interval of time and then be rapidly translated to recorded form generally as groups of information items.

It is an object of the present invention to provide a new and improved data storage system of the magnetic media storage type which avoids one or more of the limitations and disadvantages of prior such systems.

It is a further object of the invention to provide a novel data storage system which is capable of translating data information to and from storage at a high translation rate yet one which possesses an inherent ability to receive and accurately store items of data information presented in sequential code bit form for storage at a substantially lower rate.

It is an additional object of the invention to provide an improved data storage system which may utilize the numerous important advantages characteristic of magnetic drum and disc storage media arranged for high rates of data translation but which at the same time place no appreciable limitation on a much slower rate at which data items may be presented in serial code bit form for storage by magnetic recording techniques.

It is yet a further object of the invention to provide a new data storage system utilizing magnetic storage media and a non-return-to-zero type of recording, and one wherein code bits representing a data item are sequentially presented and individually recorded but with a time lapse between successive bit recordings in successive recording positions of a magnetic medium while yet retaining the normal characteristics of the non-return-to-zero type of recording and free of recorded transients.

Figure 2:
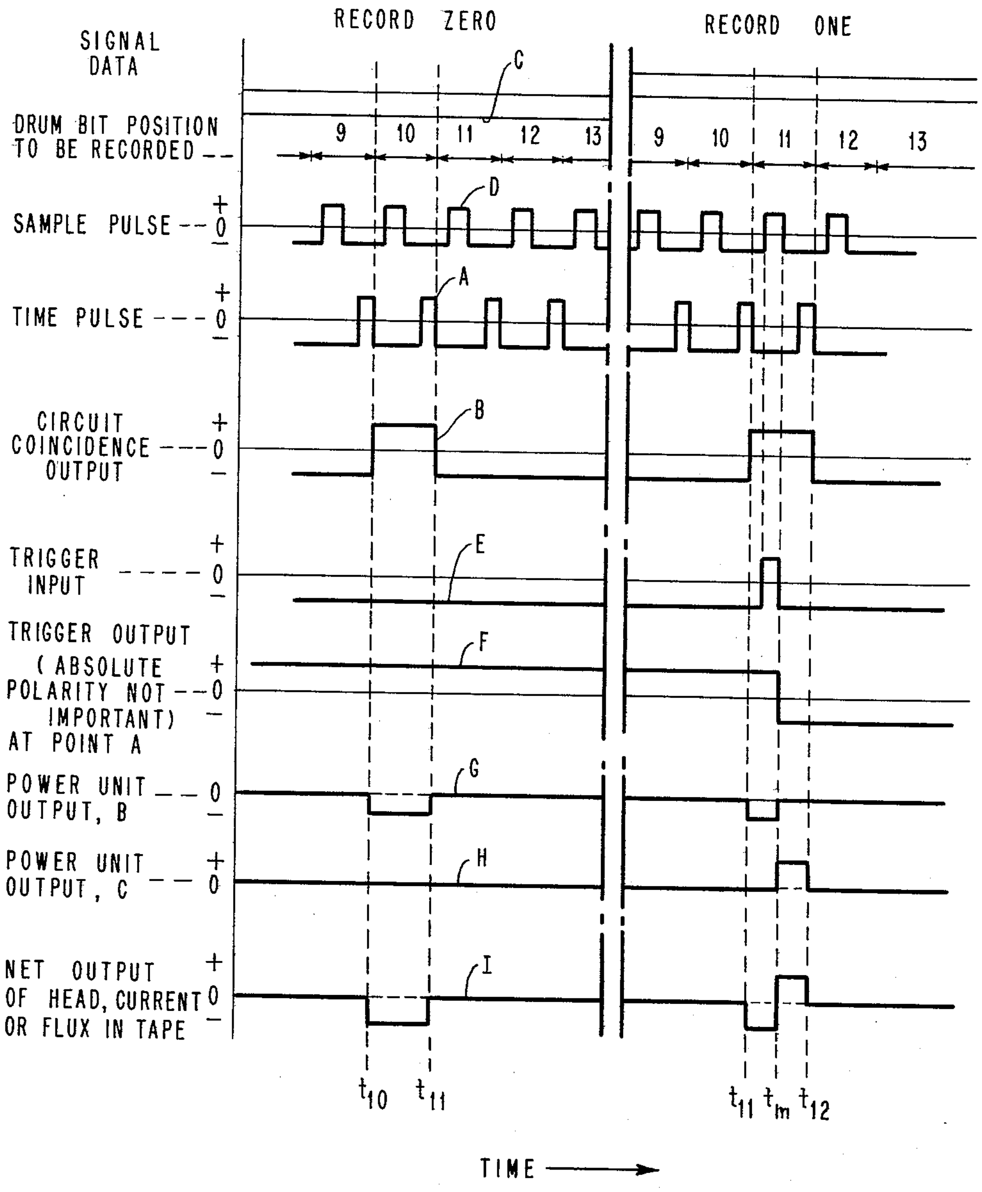
Figure 3:
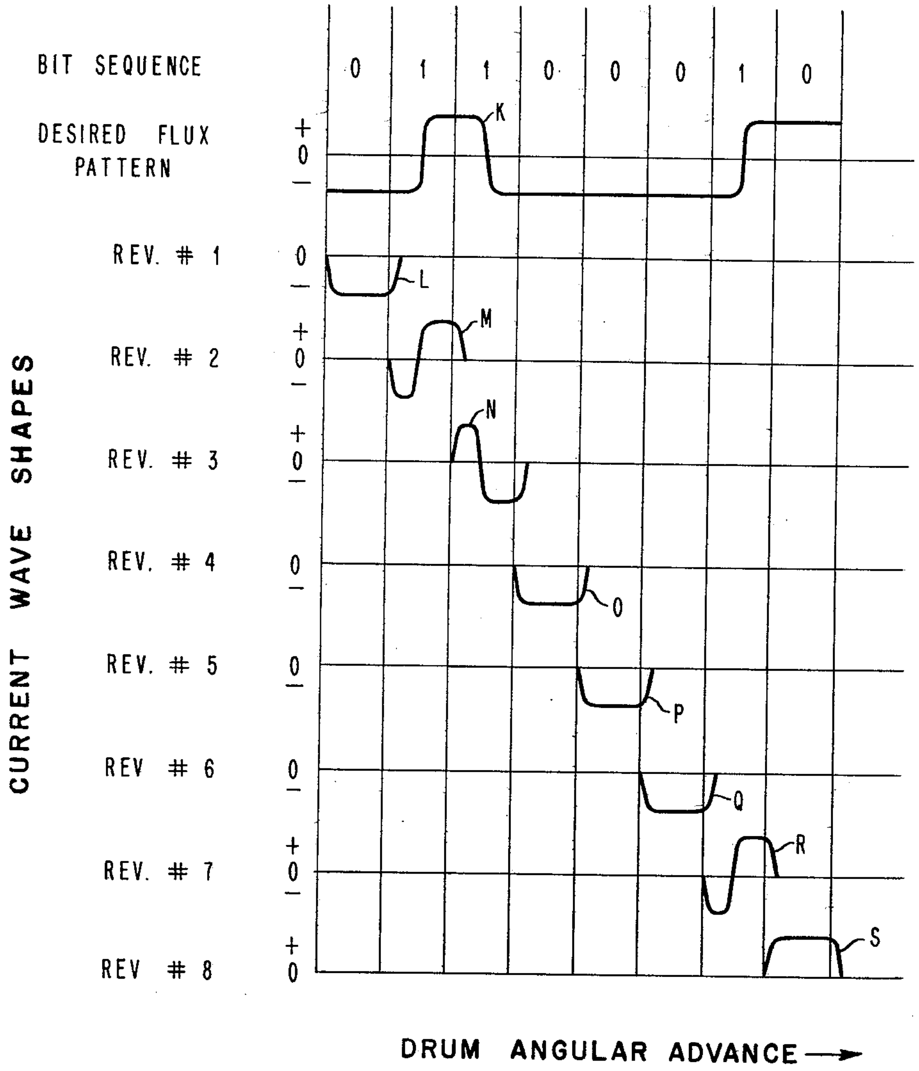

Other objects and advantages of the invention will appear as the detailed description thereof proceeds in the light of the drawings forming a part of this application, and in which:

FIG. 1 represents schematically a data storage system embodying the present invention;

FIG. 2 graphically represents certain voltage relationships occurring in the FIG. 1 system and is used as an aid in explaining its operation; and FIG. 3 graphically represents a sequence of magnetic recordings effected during successive revolutions of the magnetic recording drum utilized in the FIG. 1 system and the form of the ultimate recording on the drum resulting from these successive recordings.

Referring now more particularly to FIG. 1, the data storage system includes a magnetic recording means having fixed recording heads and a relatively movable recording medium providing a magnetic recording surface of which each recording area is cyclically and repetitively presented to the recording heads to record data bits in successive bit recording positions forming continuous recording tracks on the recording surface. This recording means may be of any conventional form, such as a recording disc or drum, and for purposes of the present description the storage system is shown as utilizing a magnetic recording drum 10 of which only an angular segment is shown for simplicity. The FIG. 1 storage system is illustrated by way of example as including six data translating channels, of which each utilizes data translation components arranged as indicated in connection with channel No. 1 and including a fixed recording head 11 associated with the magnetic recording surface 12 of the recording drum 10. As indicated in broken lines in connection with the recording surface 12, the latter for recording purposes may be considered as divided longitudinally into a plurality of axially concentric recording tracks identified with each of the translating channels and each such track is divided circumferentially into successive bit storage positions. There are an integral number of these bit storage positions, or bit recording areas, in each of the recording tracks in conformity with conventional practices in magnetic drum recording arrangements. As will be explained more fully hereinafter, the bits of a code bit group representing an item of data and the items of data themselves are successively presented to the storage system for recording. Thus, a continuing succession of code bits is presented to each channel and these code bits are successively recorded, utilizing a non-return-to-zero form of recording, in successive bit recording positions of a recording track on the drum 10.

To synchronize all operations of the data storage system, the surface 12 of the drum 10 is provided with a timing track 13 having permanently recorded pulses which identify each bit storage position and also includes a track 14 having one permanent recording which identifies each complete revolution of the drum 10. A read head 15 is associated with the timing track 13 to derive timing potential pulses which identify the positioning of each bit storage position of a recording track in proper recording relation to the recording heads 11 of the several channels. These timing pulses are amplified and shaped by an amplifier and pulse shaper unit 16 and are applied to an AND gate 17. A read head 18 is also associated with the track 14 to derive a potential pulse indicative of the completion of each drum revolution, and these derived potential pulses are translated by an amplifier and pulse shaper unit 19 to an AND gate 20. The pulses derived by the read heads 15 and 18 are also applied to a drum address reset unit 21, which may be manually controlled by a switch 22 to select an initial address or bit storage position of the drum 10 at which a new recording is to begin. This reset control of the unit 21 is accompanied by the generation in an output circuit 23 of a reset potential which resets certain counters hereinafter described and also resets bit storage triggers of the storage system. Following termination of the reset potential in the output circuit 23, an output circuit 24 of the unit 21 is energized and this energization is supplied through an output circuit 25 to initiate operation of the data source equipment to start the supply of data to the storage system. The potential of the output circuit 24 is also supplied to the AND gates 17 and 20 to effect translation of timing pulses by the AND gate 17 and of bit count pulses by the AND gate 20. The potential of the output circuit 24 is also applied to an AND gate 26 which translates data sample pulses developed by the amplifier and pulse shaper unit 16.

Data to be recorded is supplied to the data storage system through a data input channel 27 individual to each translation channel of the storage system. This data individual to each channel is supplied to an AND gate 28, which also receives data sample pulses from the output circuit of the AND gate 26 and coincidence pulses generated in the output circuit of an AND gate 29.

The coincidence pulses last mentioned are generated in the output circuit of the AND gate 29 whenever a write status potential is applied to this gate through an input circuit 30 during intervals when data is to be stored and whenever the AND gate 29 is further conditioned by a potential pulse developed in the output circuit of a coincidence circuit unit 31. The latter unit has plural input circuits coupled to corresponding output circuits of a counter unit 32, identified for convenience as counter No. 1, and also has plural input circuits coupled to corresponding output circuits of a counter 33 identified for convenience as counter No. 2. The counter 32 may be comprised by a closed ring of counter stages and is supplied with timing pulses from the output circuit of the AND gate 17. It operates to count the number of bit storage positions successively presented to the recording head 11 of each translation channel. The counter 33 is supplied with bit count pulses developed in the output circuit of the AND gate 20 and operates to count the number of successive complete revolutions of the drum 10. Since as will presently be explained, there is one data code bit stored during each complete revolution of the drum 10, the counter 33 effectively counts the number of bits so stored during a given operating interval. The coincidence circuit unit 31 is so arranged that a pulse is developed in the output circuit of this unit whenever the energization of individual but successive ones of the ouput circuits of the counter 32 occurs in time coincidence with the energization of individual but successive ones of the output circuits of the counter 33. Expressed in other words, a pulse is developed in the output circuit of the unit 31 each time that the count contained in the counters 32 and 33 is identical.

Thus, the unit 31 develops one output pulse for each complete revolution of the drum 10, but due to the coincidence relationships established between the energizations of the output circuits of the counters 32 and 33 these output pulses of the unit 31 occur at the time when successive bit storage positions of the drum 10 are presented to the recording head 11 during successive complete revolutions of the drum 10. To illustrate this more clearly by way of example, assume that the coincidence unit 31 develops an output pulse whenever the output circuit 36 of the counter 32 is energized concurrently with the output circuit 37 of the counter 33, that an output pulse is also developed when the output circuit 38 of the counter 32 is energized concurrently with energization of the output circuit 39 of the counter 33, etc. It will be apparent that with both of the counters 32 and 33 starting their count from a unit value, an output pulse is developed by the coincidence unit 31 at the first bit storage position of the first revolution of the drum 10 when both of the output circuits 36 and 37 of the respective counters 32 and 33 are concurrently energized. However, no further output pulse is developed by the unit 31 with respect to successive energization of the further output circuits of the counter 32 during this first drum revolution since only the output circuit 37 of the counter 33 is energized at this time. As the drum 10 begins its second revolution, the counter 33 in being supplied with a bit count pulse thereupon deenergizes its output circuit 37 and energizes its output circuit 39. The energization of the output circuit 36 of the counter 32 concurrent with the presentation of the first bit storage position to the recording head is not now effective to develop an output pulse by the coincidence unit 31 since the output circuit 37 of the counter 33 is no longer energized. However, as the next or second bit storage position is presented to the recording head 11 and a further timing pulse is applied to the counter 32 to cause it to deenergize its output circuit 36 and to energize its output circuit 38, an output pulse is developed by the coincidence unit 31 since there is coincidence between the concurrent energizations of the output circuits 38 and 39 of the respective counters 32 and 33.

Whenever a coincidence pulse from the AND gate 29, a data sample pulse from the AND gate 26, and a data bit applied to the input circuit 27 are all concurrently applied to the AND gate 28, the latter translates the data sample pulse to the input circuits of a data bit storage trigger unit 41 of the bistable type and operating in binary fashion by which its 0 and 1 output circuits are alternately energized in response to successively applied sample pulses. The 0 output circuit potential of the trigger 41 is applied to an AND gate 42 to effect translation to a write driver amplifier unit 43 of a coincidence pulse applied from the AND gate 29 to the AND gate 42. The 1 output circuit potential of the trigger 41 is applied to an AND gate 44 to effect translation to a write driver amplifier unit 45 of a coincidence pulse also applied to the AND gate 44. The units 43 and 45 energize individual halves of the winding of the recording head 11 as indicated to develop magnetic recording fields of opposite polarities which for convenience of description are hereinafter assumed to be negative for the drive unit 43 and positive for the unit 45. Thus the trigger 41 in its Off state energizes its 0 output circuit to cause the coincidence pulse translated by the AND gate 42 and driver unit 43 to be recorded or stored as a negative magnetic recording in a coincidence pulse selected bit storage position of the drum 10 whereas the On state of the trigger 41 energizes its 1 output circuit to cause the coincidence pulse translated by the units 44 and 45 to be recorded or stored as a positive magnetic recording in a coincidence pulse selected bit storage position of the drum 10. The precise time relationships involved in these bit storage position recordings will now be more fully explained in connection with the timing relationships graphically shown in FIG. 2.

The timing pulses generated by the unit 16 and translated by the AND gate 17 are graphically represented in FIG. 2 by curve A and identify, as previously noted, the time of presentation of successive bit recording positions to the recording heads 11 of the several translating channels. A number of these bit storage positions are indicated in association with curve A of FIG. 2 and are identified by way of example as numbered storage positions 9 through 13. Curve B of FIG. 2 represents the coincidence pulses developed in the output circuit of the AND gate 29 for the assumed conditions that the first such pulse occurs at time $t_{10}$–$t_{11}$ coincident with the presentation, in a given drum revolution, of storage position No. 10 to the recording head 11 whereas the next such coincidence pulse occurs in the next succeeding drum revolution during the time interval $t_{11}$–$t_{12}$ coincident with the presentation of bit storage position No. 11 to the recording head 11.

Curve C of FIG. 2 represents the binary value of two successive data bits applied to the AND gate 28, the data bits being shown by way of example as having negative value during the interval $t_{10}$–$t_{11}$ of the first drum revolution here considered and as having positive value during the interval $t_{11}$–$t_{12}$ of the second drum revolution considered. Curve D represents the sample pulses translated by the AND gate 26 and supplied to the data input AND gate 28. Curve E represents the sample pulses translated by the AND gate 28 under the assumed conditions of data applied to this gate, and it will be noted that no sample pulse is translated by this gate during the time interval $t_{10}$–$t_{11}$ of the first drum revolution since the data bit has negative value at this time but a sample pulse is translated by the AND gate 28 during the time interval $t_{11}$–$t_{12}$ of the next drum revolution since a positive value of data bit is now applied to the AND gate 28.

Curve F of FIG. 2 represents the 0 output circuit potential of the trigger 41 for the assumed condition that the 0 output circuit is energized during the first drum revolution considered (the output potential of the 1 output circuit of the trigger 41 is not shown for simplicity since it will vary in opposition to the potential variations represented by curve F). It will be noted from curve F that the sample pulse translated by the AND gate 28 causes the trigger 41 at time $t_m$ to reverse its state and thereby deenergize its 0 output circuit and energize its 1 output circuit. Curves G and H represent the current supplied by the respective write driver units 43 and 45 during the two drum revolutions here considered, and curve I represents the resultant magnetic field intensities and polarities developed by the recording head 11 during the two drum revolutions considered.

It will be seen from curve I that a negative polarity recording field is developed by the recording head 11 during the interval $t_{10}$–$t_{11}$ of the first drum revolution by reason of the assumed condition that the trigger 41 had been left in the 0 state by preceding events, and that this negative polarity recording field continues for the time interval $t_{11}$–$t_m$ of the second drum revolution but then changes to a positive polarity magnetic field for the time interval $t_m$–$t_{12}$ by reason of the positive data bit supplied to the AND gate 28 during this second drum revolution.

FIG. 3 graphically represents the resultant data recording effected in the manner just described for an assumed sequence of data bit values represented in binary fashion at the top of FIG. 3. The desired recording flux pattern using the non-return-to-zero form of recording for this sequence of presented data bits is represented by curve K. The bit value 0 corresponds to a negative value of potential applied to the data AND gate 28, and the data bit value 1 corresponds to a positive value of potential applied to the AND gate 28. In the manner previously described, the recording effected during the first of a succession of drum revolutions by the recording head 11 will be a magnetic pulse of negative polarity represented by curve L and it will be noticed that in making this recording the magnetic field intensity builds up and decays at a finite rate. By reason of the value of the second data bit of 1, the magnetic recording effected during the second drum revolution is represented by curve M and begins as a negative polarity recording but changes to a positive polarity recording by reason of the change of state of the data storage trigger 41. It will be noted that the recording position corresponding to build-up interval of the magnetic field intensity at the initiation of the recorded pulse represented by curve M overlaps precisely the recording position corresponding to the decay interval of the preceding recorded pulse represented by curve L so that the total net resultant flux in the recording medium of these successive recordings during successive drum revolutions has constant value as represented by curve K. In similar manner, successive ones of the presented data bits are recorded during successive drum revolutions as represented by curves N–S. In each instance, the build-up time of a succeeding bit recording precisely overlaps the decay time of a preceding bit recording. Thus, the ultimate recording of the successive bits occurs in the non-return-to-zero form represented by curve K, and this is accomplished without the recording of any transients even though the successive bits are individually recorded in successive drum revolutions.

It will be apparent from the foregoing description of the invention that the rate of presentation of successive data bits for recording may be substantially lower than the rate at which it would otherwise be possible to record such bits if presented at the rate of presentation of successive bit storage positions to the recording head 11. Yet in recording such data bits presented at the rate of one each recording drum revolution, all bits are recorded in full conformity with the non-return-to-zero form of recording and free of recorded transients. The bit storage position at which each recording operation starts is established by the initial setting of the counters 32 and 33 under control of the address reset unit 21 which also initially resets the triggers 41 of the several translating channels to their Off states at which their 0 output circuits are energized. In simple form, the reset unit 21 may be a one shot multivibrator which is turned On, to energize the output circuit 23 and reset the counters 32 and 33 each to a count of one, by coincidence of timing and hometrack pulses and closure of the switch 22 and which thereafter turns Off to energize output circuit 24.

Usually the counter 33 will provide a total count corresponding to the number of bit storage positions in a recording track of the drum 10. An AND gate 47 may utilize this total count and a coincidence output pulse of the unit 31 to generate in an output circuit 48 a control pulse which, as desired, may either halt the further supply of data to the recording system or may remove the supply of data from one of the translating channels of the system and transfer the supply to successive or successively selected ones of the channels.

To permit interrupting a data storage operation at any bit storage position, and have it automatically resume at the next successive bit storage position, the write status potential may, if desired, be supplied through an input circuit 49 to control an AND gate in the counter 33 and through which the bit count pulses are translated to control the counting operation of this counter.

While a specific form of the invention has been described for purposes of illustration, it is contemplated that numerous changes may be made without departing from the spirit of the invention.

What is claimed is:

1. A data storage system comprising means having a rotatable magnetic recording surface and fixed recording head adapted to record data bits in successive bit recording positions forming an axially concentric recording track on said surface, first means for performing a count of the number of said bit recording positions passing said recording head, second means for performing a count of the number of complete transverses of said track, coincidence means responsive to the counts of said first and second counting means for developing coincidence control potential pulses having a pulse duration substantially coincident with the movement of each said bit recording position past said recording head and a pulse interval corresponding to the time of one complete traverse of said track, and energizing means for receiving data to be recorded and responsive thereto for energizing said recording head during each said coincidence pulse to effect recording of said data by alternation between two magnetic recording field polarities.

2. A data storage system comprising means having a rotatable magnetic recording surface and fixed recording head adapted to record data bits in successive bit recording positions forming an axially concentric recording track on said surface, first means for performing a count of the number of said bit recording positions passing said recording head, second means for performing a count of the number of complete traverses of said track, coincidence means responsive to the counts of said first and second counting means for developing coincidence control potential pulses having a pulse duration substantially coincident with the movement of each said bit recording position past said recording head and a pulse interval corresponding to the time of one complete traverse of said track, means for receiving data and responsive to said coincidence pulses for translating the received data, bistable means having two bistable states and responsive to successive presentations thereto of translated data of preselected binary unit value for alternating between said two states thereof, and means responsive to said bistable states of said bistable means and to said coincidence pulses for supplying to said recording head energizing currents of polarity varying with said bistable states to effect recording of said data by alternation between two magnetic recording field polarities.

3. A data storage system comprising magnetic recording means including a recording head and a relatively movable recording medium providing a magnetic recording surface of which each recording area is cyclically and repetitively presented to said head to record in serial order data bits of a character in successive bit recording position forming a continuous recording track on said surface, energizing means for receiving data to be recorded and responsive thereto for energizing said recording head to effect a recording of said data, addressing means responsive to a control signal for controlling said energizing means to permit recording in said track of a single bit of a character once each complete traverse of said track and to permit recording of successive data bits in successive ones of said bit recording positions during successive traverses of said track, said addressing means comprising counting means controlled by each complete traverse of said track and each successive data bit recording positions in successive traverses of said track to produce an output signal whenever the number of complete traverses of said track and the successive data bit recording positions during successive traverses of said track are equal in number, and a connection between said counting means and said energizing means for delivering said output signal to the latter.

4. A data storage system comprising magnetic recording means including a recording head and a relatively movable recording medium providing a magnetic recording surface of which each recording area is cyclically and repetitively presented to said head to record in serial order data bits of a character in successive bit recording positions forming a continuous recording track on said surface, energizing means for receiving data to be recorded and responsive thereto for energizing said recording head to effect a recording of said data, addressing means responsive to a control signal for controlling said energizing means to permit recording in said track of a single bit of a character once each complete traverse of said track and to permit recording of successive data bits in successive ones of said bit recording positions during successive traverses of said track, said addressing means comprising a first counter for counting each complete traverse of said track, a second counter for counting successive data bit recording positions during successive traverses of said track, means for comparing the count registered in said counters and for producing an output signal when the counts in said counters are equal, and a connection between said comparing means and said energizing means for delivering said output signal to the latter.

5. A data storage system comprising magnetic recording means including a recording head and a relatively movable recording medium providing a magnetic recording surface of which each recording area is cyclically and repetitively presented to said head to record in serial order data bits of a character in successive bit recording positions forming a continuous recording track on said surface, energizing means for receiving data to be recorded and including bistable means alternating between two bistable states in response to successive presentations thereto of data bits of preselected binary unit value for energizing said recording head to effect a non-return-to-zero type of recording of said data by alternating between two magnetic recording polarities, addressing means responsive to a control signal for controlling said energizing means to permit recording in said track of a single bit of a character once each complete traverse of said track and to permit recording of successive data bits in successive ones of said bit recording positions during successive traverses of said track, said addressing means comprising a first counter for counting each complete traverse of said track, a second counter for counting successive data bit recording positions during successive traverses of said track, means for comparing the count registered in said counters and for producing an output signal when the counts in said counters are equal, and a connection between said comparing means and said energizing means for delivering said output signal to the latter.

6. A data storage system comprising magnetic recording means including a recording head and a relatively movable recording medium providing a magnetic recording surface of which each recording area is cyclically and repetitively presented to said head to record in serial order data bits of a character in successive bit recording positions forming a continuous recording track on said surface, means for providing first indicia representative of the successive presentation for recording in each of said bit recording positions and other indicia representative of the completion of each track traverse, energizing means for receiving data to be recorded and responsive thereto for energizing said recording head to effect a recording of said data, and addressing means responsive to a control signal for controlling said energizing means to permit recording in said track of single bits of a character, said addressing means including a pair of counters responsive jointly to said indicia for controlling said energizing means to permit recording in said track of a single data bit once each complete traverse of said track to permit recording of successive data bits in successive ones of said bit recording positions during successive complete traversals of said track.

7. A data storage system comprising magnetic recording means including a fixed recording head and a rotatable magnetic drum providing a circumferential magnetic recording surface of which each recording area is cyclically and repetitively presented to said head to record in serial order data bits of a character in successive bit recording positions forming a continuous recording track on said surface, energizing means for receiving data to be recorded and responsive thereto for energizing said recording head to effect a non-return-to-zero type of recording of said data by alternation between two magnetic recording field polarities, addressing means responsive to a control signal for controlling said energizing means to permit recording in said track of a single bit of a character once each complete traverse of said track and to permit recording of successive data bits in successive ones of said bit recording positions during successive traverses of said track, said addressing means comprising a first counter for counting each complete traverse of said track, a second counter for counting said bit recording positions during successive traverses of said track, means for comparing the count registered in said counters and for producing an output signal when the counts in said counters are equal, and a connection between said comparing means and said energizing means for delivering said output signal to the latter.

8. A data storage system comprising magnetic recording means including a recording head and a relatively movable recording medium providing a magnetic recording surface of which each recording area is cyclically and repetitively presented to said head to record in serial order data bits of a character in successive bit recording positions forming a continuous recording track on said surface, energizing means for receiving data to be recorded and responsive thereto for energizing said recording head to effect a recording of said data, addressing means responsive to a control signal for controlling said energizing means to permit recording in said track of single bits of a character, said addressing means comprising a first counter for counting each complete traverse of said track, a second counter for counting successive data bit recording positions during successive traverses of said track, a coincidence circuit for comparing the count registered in said counters and for producing an output signal when the counts in said counters are equal, and a connection between said coincidence circuit and said energizing means for delivering said output signal to the latter.

References Cited in the file of this patent

UNITED STATES PATENTS

| | | |
|---|---|---|
| 2,845,609 | Newman | July 29, 1958 |
| 2,932,010 | Mayer et al. | Apr. 5, 1960 |
| 2,968,026 | Froggatt | Jan. 10, 1961 |

FOREIGN PATENTS

| | | |
|---|---|---|
| 216,876 | Australia | Aug. 20, 1958 |